W. MOIR.
MECHANICAL MOVEMENT.
APPLICATION FILED NOV. 15, 1919.
1,387,428.
Patented Aug. 9, 1921.
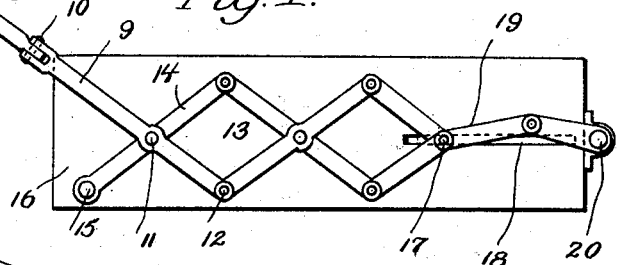
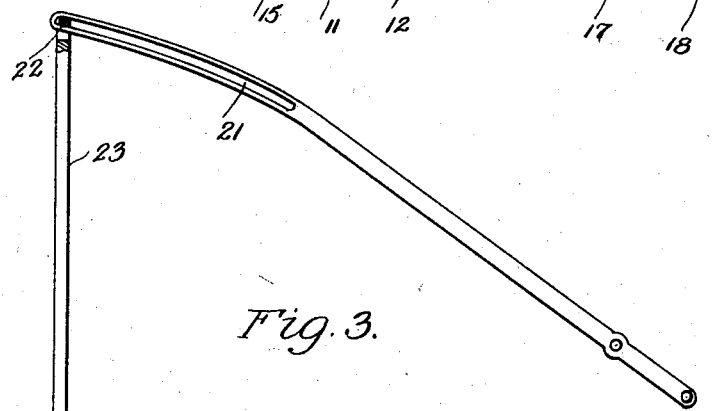
Inventor
William Moir
By Victor J. Evans
Attorney

UNITED STATES PATENT OFFICE.

WILLIAM MOIR, OF CHICAGO, ILLINOIS.

MECHANICAL MOVEMENT.

1,387,428.  Specification of Letters Patent.  Patented Aug. 9, 1921.

Application filed November 15, 1919. Serial No. 338,289.

*To all whom it may concern:*

Be it known that I, WILLIAM MOIR, a citizen of the United States, residing at Chicago, in the county of Cook and State of Illinois, have invented new and useful Improvements in Mechanical Movements, of which the following is a specification.

This invention relates to mechanical movement and has for its primary object a simple construction capable of converting rotary motion into reciprocatory motion.

An object of the invention is the construction of a movement that will enable a rapidly rotating prime mover of small HP to exert force in a rectilinear direction.

With these and other objects in view this invention will be better understood from the following detailed description taken in connection with the accompanying drawing wherein—

Figure 1 is a diagrammatic view of my invention.

Fig. 2 is a detailed sectional view.

Fig. 3 is detailed view of a modified form of my invention.

Again referring to the drawing illustrating two of the many forms in which my invention may be constructed 1 designates a belt, which in practice may be a chain or any other similar drive element. The belt rotating on the pulleys 2 has fixed thereto a plate 3. This plate 3 has ball and socket connection 4 with a sleeve 5. Slidably mounted in the sleeve 5 is the cylindrical end portion 6 of the lever 7. This lever 7 as shown in Fig. 2 consists of a main part 8 and an auxiliary part 9 connected together by a hinge joint 10.

As far as I have proceeded it will be seen that the lever will be given a swinging movement in the rotary movement of the belt 1 without subjecting any part of the lever or belt to an extensive strain due to the position of the joint 10 and ball and socket 4.

The part 9 is pivoted at the points 11 and 12 to an extensible bracket 13 known in the art as "lazy tongs." One link 14 of the bracket has one end pivoted as indicated at 15 to a base 16. The pin 17 forming the joints for the end links of the brackets is elongated and slides in a slot 18 in the base, a connecting link 19 is arranged between the bracket and the element to be operated, which in this particular case is a crank shaft 20.

In Fig. 3 I have shown the lever provided with an arcuate slot 21 the walls of which are engaged by the pin 22 in the end of the piston stem 23 of the cylinder 24.

It is of course to be understood that the invention may be constructed in various other manners and the parts associated in other relations and, therefore, I do not desire to be limited in any manner except as set forth in the claims hereunto appended.

Having thus described my invention what I claim is—

1. In combination a belt, a shaft, a lever having an adjustable connection at one end with the belt and an extensible device connected to and adaptable to be extended in the movement of the lever by the belt, a power shaft, and a link connection between the shaft and the device.

2. In combination with a belt, a sleeve having an adjustable connection with the belt and lever having one end portion slidably mounted in the sleeve and an extensible device actuated by the movement of the lever and an element for guiding the movement of the device.

3. In combination a belt, a crank arm, lazy tongs connected to actuate said arm, and a leverage drive connection between the lazy tongs and said belt.

4. In combination a belt, a crank arm, an extensible device for turning the crank arm, and a leverage member actuated by the belt and having an operative connection with the device.

In testimony whereof I affix my signature.

WILLIAM MOIR.